United States Patent
Fushimi et al.

(10) Patent No.: US 12,318,966 B2
(45) Date of Patent: Jun. 3, 2025

(54) POWDERY-MATERIAL FEEDING DEVICE

(71) Applicant: KIKUSUI SEISAKUSHO LTD., Kyoto (JP)

(72) Inventors: Shinsuke Fushimi, Kyoto (JP); Hideyuki Nishimura, Kyoto (JP); Yuuya Kawai, Kyoto (JP)

(73) Assignee: KIKUSUI SEISAKUSHO LTD., Kyoto (JP)

( * ) Notice: Subject to any disclaimer, the term of this patent is extended or adjusted under 35 U.S.C. 154(b) by 349 days.

(21) Appl. No.: 18/087,048

(22) Filed: Dec. 22, 2022

(65) Prior Publication Data
US 2023/0219263 A1 Jul. 13, 2023

(30) Foreign Application Priority Data
Jan. 7, 2022 (JP) .................................. 2022-001843

(51) Int. Cl.
  *B29C 31/06* (2006.01)
  *B29C 43/34* (2006.01)
  (Continued)

(52) U.S. Cl.
  CPC .............. *B29C 31/06* (2013.01); *B29C 43/34* (2013.01); *B29C 43/58* (2013.01); *B30B 11/005* (2013.01);
  (Continued)

(58) Field of Classification Search
  CPC ......... B29C 31/06; B29C 43/34; B29C 43/58; B29C 2043/5875; G05D 7/0605;
  (Continued)

(56) References Cited

U.S. PATENT DOCUMENTS 10,449,701 B2 * 10/2019 Kitamura ............ B01F 35/2209
10,875,217 B2 * 12/2020 Kitamura ................ B30B 15/26
(Continued)

FOREIGN PATENT DOCUMENTS

EP        0 632 255 A1   1/1995
JP      2020-168634 A   10/2020

OTHER PUBLICATIONS

Extended European Search Report, issued on Jun. 6, 2023, in European Application No. 22201840.0.

*Primary Examiner* — Frederick C Nicolas
(74) *Attorney, Agent, or Firm* — MCGINN I.P. LAW GROUP, PLLC

(57) ABSTRACT

A powdery-material feeding device includes a controller configured to selectively conduct constantly keeping-control of constantly keeping rotational speed of a motor, current or voltage applied to the motor without any change as a manipulated variable for a predetermined period, or feedback-control of repetitively obtaining a difference between a discharge flow rate of the powdery material and a target value thereof at predetermined cycles and adjusting by increasing or decreasing the manipulated variable at each of the predetermined cycles in order to reduce the difference, the controller conducts the constantly keeping-control immediately after a motor starts, shifts to the feedback-control when the difference between the discharge flow rate of the powdery material and the target value thereof has an absolute value less than a threshold after the period for the constantly keeping-control elapses, and conducts constantly keeping-control without shifting to the feedback-control when the absolute value of the difference between the discharge flow rate of the powdery material and the target value thereof is more than the threshold after the period for the constantly keeping-control elapses, and the manipulated variable during the repeated constantly keeping-control is (Continued)

changed in accordance with the difference between the discharge flow rate of the powdery material and the target value thereof after elapse of the period for latest constantly keeping-control.

20 Claims, 9 Drawing Sheets

(51) Int. Cl.
 *B29C 43/58* (2006.01)
 *B30B 11/00* (2006.01)
 *B30B 11/08* (2006.01)
 *B30B 15/26* (2006.01)
 *B30B 15/30* (2006.01)
 *G05D 7/06* (2006.01)

(52) U.S. Cl.
 CPC .............. *B30B 11/08* (2013.01); *B30B 15/26* (2013.01); *B30B 15/302* (2013.01); *G05D 7/0605* (2013.01); *B29C 2043/5875* (2013.01)

(58) Field of Classification Search
 CPC ....... B30B 11/005; B30B 11/08; B30B 15/26; B30B 15/302
 See application file for complete search history.

(56) References Cited

U.S. PATENT DOCUMENTS

| | | | |
|---|---|---|---|
| 11,173,638 B2* | 11/2021 | Kitamura | B01F 27/0723 |
| 12,122,116 B2* | 10/2024 | Kitamura | B30B 11/02 |
| 12,135,280 B2* | 11/2024 | Fushimi | B30B 15/0082 |
| 2007/0029691 A1* | 2/2007 | Nakamura | B30B 11/005 |
| | | | 425/149 |
| 2018/0229462 A1* | 8/2018 | Shimada | B30B 11/08 |
| 2020/0307139 A1 | 10/2020 | Kitamura et al. | |
| 2023/0281780 A1* | 9/2023 | Suzuki | G01N 21/8851 |
| | | | 382/141 |

\* cited by examiner

POWDERY-MATERIAL FEEDING DEVICE

BACKGROUND

A powdery-material feeding device configured to feed a rotary compression-molding machine or the like with a powdery material has conventionally conducted the following control in order to achieve a desired discharge flow rate of the powdery material.

The powdery-material feeding device is configured to conduct work called "tuning" of determining an estimated value of the discharge flow rate upon rotation of a motor at maximum speed prior to an operation start, checking whether or not an actual discharge flow rate is equal to a target value after the operation is started, and correcting rotational speed of the motor if the actual discharge flow rate is different from the target value (see JP 2020468634 A for example).

When the actual discharge flow rate is largely different from the target value, for correction of a supply amount, the powdery-material feeding device has conventionally conducted feedback-control of repetitively measuring the discharge flow rate at predetermined short cycles, and adjusting, by increasing or decreasing, the rotational speed of the motor at the same predetermined cycles in order to reduce a difference between an actually measured value and the target value. There may occur a phenomenon called "hunting" in this case. This phenomenon can be inhibited through PID control. However, there arises a different problem that it takes long time until the actual discharge flow rate approaches to the target value, as exemplarily shown in FIG. 9.

SUMMARY OF THE INVENTION

In view of the above, it is an exemplary object of the present invention to achieve a powdery-material feeding device configured to more quickly stabilize a discharge flow rate of a powdery material after an operation start.

A powdery-material feeding device according to a first aspect of the exemplary invention includes a transfer member configured to deliver a powdery material to be discharged, a motor configured to drive the transfer member, and a controller configured to control the motor, in which the controller selectively conducts constantly keeping-control of constantly keeping rotational speed of the motor, current or voltage applied to the motor without any change as a manipulated variable for a predetermined period even upon increase or decrease in discharge flow rate of the powdery material, or feedback-control of repetitively obtaining a difference between the discharge flow rate of the powdery material and a target value of the discharge flow rate of the powdery material at predetermined cycles and adjusting, by increasing or decreasing, the manipulated variable at each of the predetermined cycles in order to reduce the difference, the controller conducts the constantly keeping-control immediately after the motor starts, the controller shifts to the feedback-control when the difference between the discharge flow rate of the powdery material and the target value of the discharge flow rate of the powdery material has an absolute value less than a threshold after the period for the constantly keeping-control elapses, and the controller conducts constantly keeping-control again without shifting to the feedback-control when the absolute value of the difference between the discharge flow rate of the powdery material and the target value of the discharge flow rate of the powdery material is more than the threshold after the period for the constantly keeping-control elapses, and the manipulated variable during the repeated constantly keeping-control is changed in accordance with the difference between the discharge flow rate of the powdery material and the target value of the discharge flow rate of the powdery material after elapse of the period for latest constantly keeping-control.

A powdery-material feeding device according to a second aspect of the exemplary invention includes a hopper configured to reserve a powdery material, a transfer member configured to deliver the powdery material to be discharged, a motor configured to drive the transfer member, and a controller configured to control the motor, in which the controller selectively conducts constantly keeping-control of constantly keeping rotational speed of the motor, current or voltage applied to the motor without any change as a manipulated variable for a predetermined period even upon increase or decrease in discharge flow rate of the powdery material, or feedback-control of repetitively obtaining a difference between the discharge flow rate of the powdery material and a target value of the discharge flow rate of the powdery material at predetermined cycles and adjusting, by increasing or decreasing, the manipulated variable at each of the predetermined cycles in order to reduce the difference, the controller conducts the constantly keeping-control immediately after the hopper is filled with the powdery material, the controller shifts to the feedback-control when the difference between the discharge flow rate of the powdery material and the target value of the discharge flow rate of the powdery material has an absolute value less than a threshold after the period for the constantly keeping-control elapses, and the controller conducts constantly keeping-control again without shifting to the feedback-control when the absolute value of the difference between the discharge flow rate of the powdery material and the target value of the discharge flow rate of the powdery material is more than the threshold after the period for the constantly keeping-control elapses, and the manipulated variable during the repeated constantly keeping-control is changed in accordance with the difference between the discharge flow rate of the powdery material and the target value of the discharge flow rate of the powdery material after elapse of the period for latest constantly keeping-control.

Such configurations achieve reduction in the number of times of constantly keeping-control and quicker change to an appropriate supply amount of the powdery material through setting a change range between the manipulated variable during initial constantly keeping-control and repeated constantly keeping-control to an appropriate value adequately larger than an increased or decreased amount of the manipulated variable at each of the predetermined cycles during the feedback-control.

Examples of a method of determining the flow rate of the powdery material in the powdery-material feeding device configured as described above include measuring the discharge flow rate of the powdery material based on mass of the powdery material in the hopper. Such a configuration leads to indirect measurement of the discharge flow rate of the powdery material based on the mass of the powdery material actually fed from the hopper, enabling accurate measurement of the discharge flow rate of the powdery material.

The manipulated variable during the repeated constantly keeping-control is desirably determined by multiplying the manipulated variable during the latest constantly keeping-control by a reciprocal of a ratio of the discharge flow rate of the powdery material after elapse of the period for the latest constantly keeping-control to the target value thereof.

Such a configuration allows the discharge flow rate of the powdery material to approach the target value more quickly.

The predetermined period for the constantly keeping-control is desirably ten times or more the predetermined cycles for the feedback-control. Such a configuration enables quicker stabilization of the supply amount of the powdery material.

A powdery material is an aggregate of minute solids and conceptually includes an aggregate of particles such as so-called granules and an aggregate of powder smaller than such particles. Specific examples of the powdery material include a powdery material containing a principal agent, an excipient, a binder, a disintegrant, a stabilizer, and a preservative. The powdery material according to the exemplary invention also includes a mixture of two or more types of powdery materials, and a powdery material containing the principal agent mixed with a lubricant such as magnesium stearate.

The exemplary invention may achieve a powdery-material feeding device configured to more quickly stabilize a discharge flow rate of a powdery material after an operation start.

BRIEF DESCRIPTION OF THE DRAWINGS

The exemplary aspects of the invention will be better understood from the following detailed description of the exemplary embodiments of the invention with reference to the drawings.

DETAILED DESCRIPTION OF AN EXEMPLARY EMBODIMENT

An exemplary embodiment of the invention will now be described with reference to the drawings. Initially described is an outline of a rotary compression-molding machine (hereinafter, referred to as the "molding machine") A exemplifying a machine configured to conduct post treatment of mixed-powdery materials discharged to be fed from a powdery-material feeding device according to the exemplary embodiment.

Figure 1:
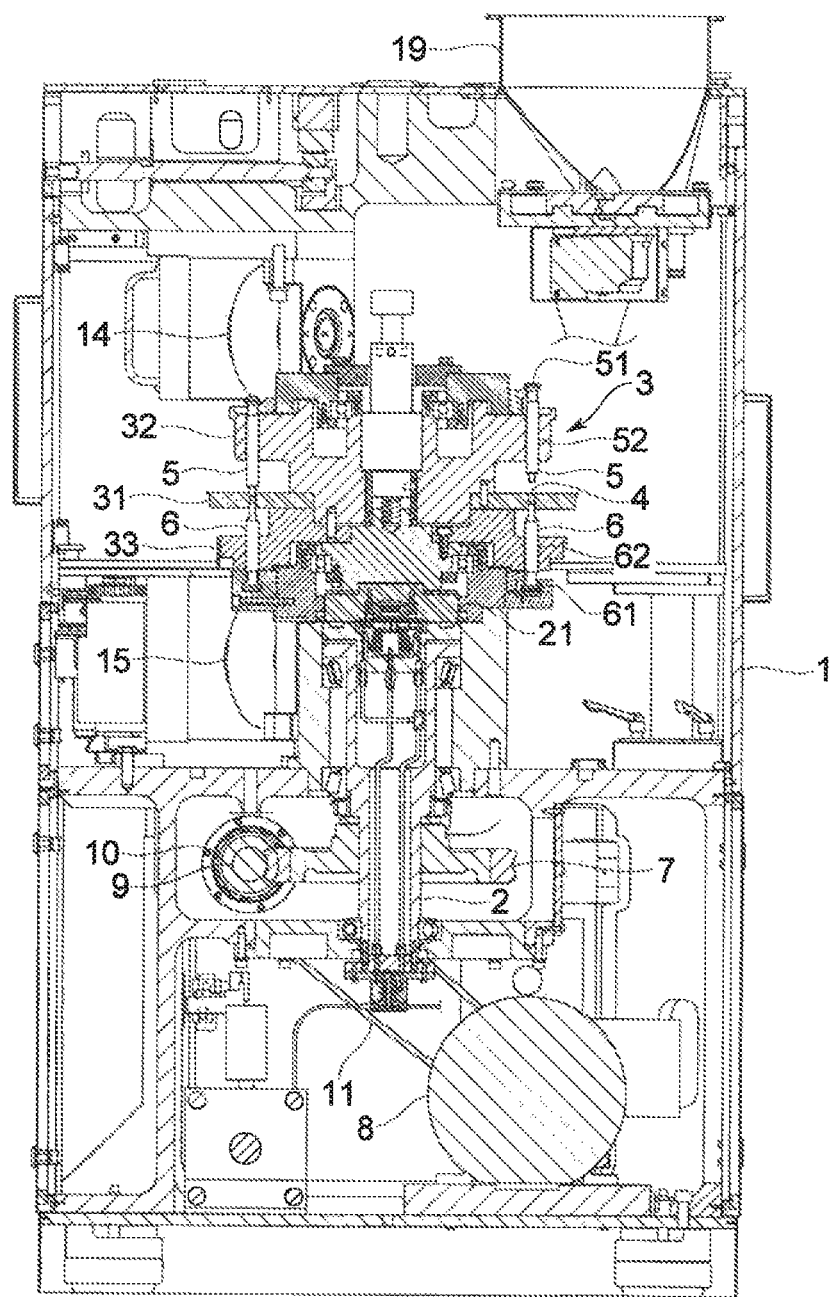
FIG. 1 is a side sectional view of a rotary compression-molding machine according to an exemplary embodiment of the invention.

The molding machine A is configured to fill each die bore 4 with mixed-powdery materials and compress the powdery materials with punches 5 and 6 to mold a pharmaceutical tablet, a food product, an electronic component, or the like. As shown exemplarily in FIG. 1, the molding machine A includes a frame 1 accommodating an upright shaft 2 functioning as a rotary shaft, and a turret 3 is attached to a connection portion 21 that is disposed at the top of the upright shaft 2.

The turret 3 horizontally rotates about the upright shaft 2, and more specifically, spins thereabout. The turret 3 includes a table (e.g., a die disc) 31, an upper punch-retaining portion 32, and a lower punch-retaining portion 33. As shown exemplarily in FIG. 2, the die table 31 has a substantially circular disc shape, and has a plurality of die bores 4 that is disposed in an outer circumferential portion and is aligned in a direction of rotation at predetermined intervals. Each of the die bores 4 vertically penetrates the table 31. The die table 31 is alternatively divided into a plurality of plates. Instead of forming the die bores 4 by directly drilling into the die table 31, the die table 31 is alternatively provided with a plurality of die members that is separate from the die table 31 and is detachably attached thereto. In this case, each of the die members has a die bore penetrating vertically.

The die bores 4 are each provided with an upper punch 5 and a lower punch 6 disposed above and below the die bore 4, respectively. As shown exemplarily in FIG. 3, the upper punch 5 and the lower punch 6 are retained by the upper punch-retaining portion 32 and the lower punch-retaining portion 33 so as to be independently slidable vertically with respect to the die bore 4. The upper punches 5 each have a tip 53 that enters and exits a corresponding one of the die bores 4. As further shown exemplarily in FIG. 3, the lower punches 6 each have a tip 63 that is kept inserted in a corresponding one of the die bores 4. The upper punches 5 and the lower punches 6 horizontally rotate, and more specifically revolve, about the upright shaft 2 along with the turret 3 and the die bores 4.

The upright shaft 2 has a lower end to which a worm wheel 7 is attached. The worm wheel 7 meshes with a worm gear 10. The worm gear 10 is fixed to a gear shaft 9 that is driven by a motor 8. Drive power outputted from the motor 8 is transmitted to the gear shaft 9 through a belt 11, so as to drive and to rotate the upright shaft 2 by the worm gear 10 and the worm wheel 7, and further to rotate the turret 3 and the punches 5 and 6.

Figure 4:
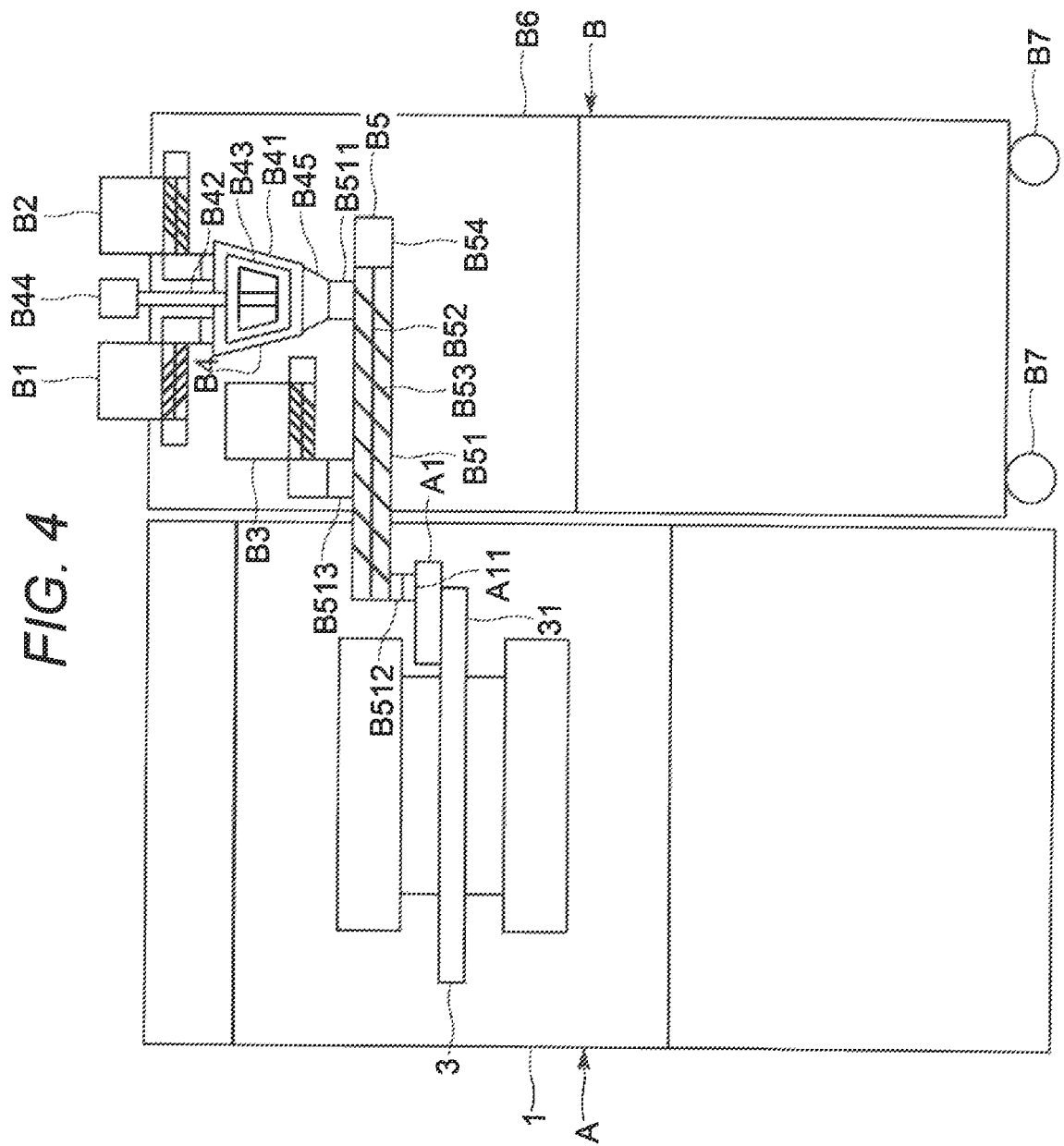
FIG. 4 is a side view schematically showing configurations of the compression-molding machine and a powdery-material mixing and feeding system according to the exemplary embodiment.

A powdery material as a raw material for a compression molded product like a pharmaceutical tablet is filled in the die bores 4 with use of a feeder A1 serving as a filling device. The feeder A1 can be an agitated feeder or a gravity feeder, either one of which is applicable to the exemplary invention. The powdery material is fed to the feeder A1 with use of a powdery-material mixing and feeding system B (shown in FIG. 4) including the powdery-material feeding device to be described later. The powdery-material mixing and feeding system B is detachably attached to the molding machine A.

Figure 2:
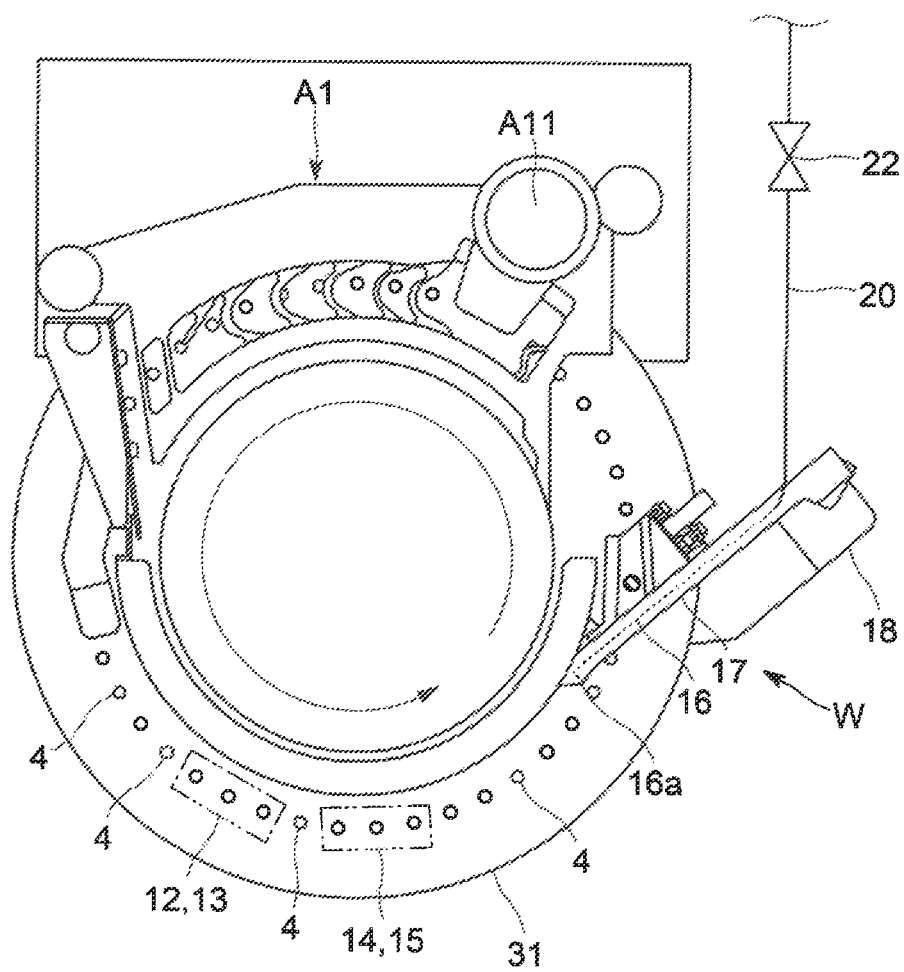
FIG. 2 is a plan view of a main part of the compression-molding machine according to the exemplary embodiment.
Figure 3:
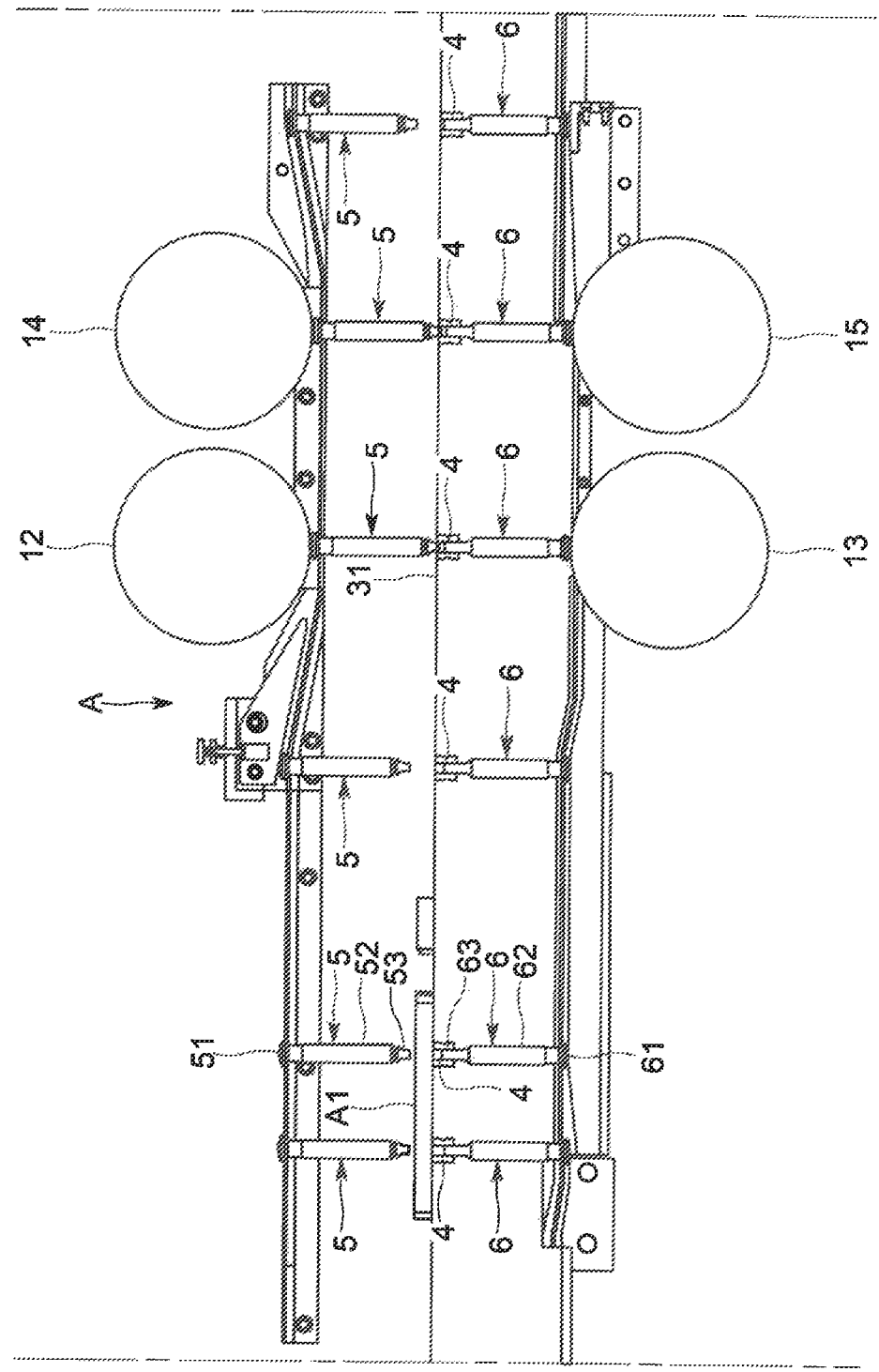
FIG. 3 is a cylindrical view of the compression-molding machine according to the exemplary embodiment.

As shown exemplarily in FIGS. 2 and 3, a preliminary compression upper roll 12, a preliminary compression lower roll 13, a substantial compression upper roll 14, and a substantial compression lower roll 15 are disposed on orbits of the punches 5 and 6 that revolve about the upright shaft 2. The preliminary compression upper roll 12 and the preliminary compression lower roll 13 are paired to vertically sandwich the punches 5 and 6, and the substantial compression upper roll 14 and the substantial compression lower roll 15 are paired to vertically sandwich the punches 5 and 6. The preliminary compression upper roll 12 and the preliminary compression lower roll 13, as well as the substantial compression upper roll 14 and the substantial compression lower roll 15, bias the upper and lower punches 5 and 6 to bring the upper and lower punches 5 and 6 closer to each other, so that the tips 53 and 63 compress from above and below the powdery material filled in the die bores 4.

The upper and lower punches 5 and 6 have the heads 51 and 61 pressed by the rolls 12, 13, 14, and 15, and the trunks 52 and 62 are smaller in diameter than the heads 51 and 61. The upper punch-retaining portion 32 (e.g., shown in FIG. 1) of the turret 3 vertically slidably retains the trunks 52 of the upper punches 5, whereas the lower punch-retaining portion 33 vertically slidably retains the trunks 62 of the lower punches 6. The tips 53 and 63 of the trunks 52 and 62 are thinner than the remaining portions and each have a diameter substantially equal to inner diameter of the die bores 4 so as to be insertable into the die bores 4. The punches 5 and 6 revolve to cause the rolls 12, 13, 14, and 15 to come closer to the heads 51 and 61 of the punches 5 and 6. The rolls 12, 13, 14, and 15 come into contact with the heads 51 and 61 so as to step thereunto. The rolls 12, 13, 14, and 15 further press the upper punches 5 downward and press the lower punches 6 upward. While the rolls 12, 13, 14, and 15 are in contact with flat surfaces of the punches 5 and 6, the punches 5 and 6 keep applying constant pressure to the powdery material in the corresponding die bores 4.

There is a product-unloading portion disposed ahead, in the rotation direction of the turret 3 and the punches 5 and 6, of a portion pressed by the substantial compression upper roll 14 and the substantial compression lower roll 15. At the product-unloading portion, the lower punch 6 ascends until the upper end surface of the tip 63 of the lower punch 6 becomes substantially as high as the upper end of the die bore 4, or the upper surface of the die table 31, and pushes a molded product out of the die bore 4. The product-unloading portion includes a guide member 17 (e.g., see FIG. 2) configured to guide the molded product pushed out of each of the die bores 4. The molded product pushed out of each of the die bores 4 is brought into contact with the guide member 17 due to rotation of the turret 3, and is shifted along the guide member 17 toward a molded-product collecting position 18.

The powdery-material mixing and feeding system B according to the exemplary embodiment will be described next in terms of its configuration. The powdery-material mixing and feeding system B is configured to feed a machine configured to conduct a post-treatment, and specifically, the molding machine A herein, with mixed-powdery materials. As exemplarily shown in FIG. 4, the powdery-material mixing and feeding system B includes a plurality of volumetric feeders B1, B2 and B3 functioning as powdery-material feeding devices each configured to reserve a powdery material and discharge the reserved powdery material, and mixers B4 and B5 each configured to mix the powdery materials discharged from each of the plurality of volumetric, feeders B1, B3 and B3 and to discharge the mixed-powdery materials.

The powdery-material mixing and feeding system B includes the three volumetric feeders B1, B2 and B3. The number of the feeders B1 to B3 is changed in accordance with the number of types of powdery materials to be mixed. There can be included two, or four or more feeders. The volumetric feeders B1 to B3 can discharge different types of powdery materials or discharge a single type of a powdery material. The volumetric feeders B1 to B3 can each discharge multiple types of powdery materials preliminarily mixed. Examples of a type of a powdery material include a powdery material containing a principal agent, an excipient, a binder, a disintegrant, a lubricant, a stabilizer, and a preservative. According to the exemplary embodiment, the feeder B1 functioning as a first powdery-material feeding device discharges to feed a principal agent serving as a first powdery material, the feeder B2 functioning as a second powdery-material feeding device discharges to feed an excipient such as lactose, or a different powdery material, serving as a second powdery material, and the feeder B3 functioning as a second powdery-material feeding device discharges to feed a lubricant such as magnesium stearate serving as a second powdery material.

The mixers B4 and B5 are configured by a vertical mixer B4 and a horizontal mixer B5 connected to and disposed downstream of the vertical mixer B4. The vertical mixer B4 mixes the powdery material discharged from the feeder B1 (i.e., the principal agent), and the powdery material discharged from the feeder B2 (i.e., the excipient or the different powdery material), and simultaneously drops the mixed-powdery materials toward the horizontal mixer B5. The vertical mixer B4 includes a case B41 having a funnel shape, a vertical or substantially vertical agitation shaft B42 disposed in a center portion in the case and configured to spin, an agitating rotor B43 integrally attached to the agitation shaft, and a motor B44 configured to drive and to rotate the agitation shaft B42 and the agitating rotor B43.

The powdery materials discharged from the feeders B1 and B2 are dropped into the case of the vertical mixer B4 from thereabove. These powdery materials come into contact with the rotating agitating rotor B43, and are shifted downward in the case B41 while being agitated by the agitating rotor B43. The case B41 has a lower portion having a large number of bores (not shown) preliminarily provided to penetrate the case B41, and the mixed-powdery materials agitated in the case B41 flow out of the case B41 through the bores. The mixed-powdery materials then flow into the horizontal mixer B5 through a connection port B45.

The horizontal mixer B5 mixes the powdery materials mixed by the vertical mixer B4 (i.e., the principal agent and the excipient or the different powdery material), and the powdery material discharged from the feeder B3 (i.e., the lubricant), and simultaneously transfers the mixed-powdery materials toward the feeder A2 of the molding machine A. The horizontal mixer B5 includes a case B51 having a tubular shape extending horizontally or substantially horizontally, a horizontal or substantially horizontal agitation shaft B52 disposed in a center portion in the case B51 and configured to spin, an agitating rotor B53 attached to the agitation shaft B52, and a motor B54 configured to drive to rotate the agitation shaft B52 and the agitating rotor B53.

The case B51 has, at a laterally outer end, a reception port B511 connected to the connection port B45 of the vertical mixer B4. The case B51 further has, at a laterally inner end, a discharge port B512 connected to a feed port A11 that connects the interior and the exterior of the feeder A2 and is configured to feed the feeder A1 with a powdery material. The case B51 still further has, in an intermediate portion, a reception port B513 connected to the feeder B3. The agitation shaft B52 and the agitating rotor B53 are agitating members configured to rotate while being in contact with powdery materials to be mixed so as to mix the powdery materials and simultaneously transfer the powdery materials in a direction crossing the vertical direction. The agitating members B52 and B53 extend to a point just before the discharge port B512 at terminal ends of the mixers B4 and B5.

The powdery materials mixed by the vertical mixer B4 are supplied from the connection port B45 into the case B51 of the horizontal mixer B5 via the reception port B511. The powdery materials come into contact with the rotating agitating rotor B53, and are shifted from laterally outside to laterally inside in the case B51 while being agitated by the agitating rotor B53. During this process, the powdery material discharged from the feeder B3 is supplied into the case B51 through the reception port B513, and the powdery materials are further agitated by the agitating rotor B53. The principal agent fed from the feeder B2, the excipient or the different powdery material fed from the feeder B2, and the lubricant fed from the feeder B3 are thus mixed in the case B51 and are simultaneously transferred along the case B51. The mixed-powdery materials are eventually discharged from the discharge port B512 and are fed to the feed port A11 of the feeder A1 in the molding machine A. The feeder A1 fills each of the die bores 4 provided in the die table 31 with the mixed-powdery materials fed to the feed port A11.

The feeder A1 preliminarily includes a sensor (not shown) configured to measure a mixing degree of mixed-powdery materials fed from the powdery-material mixing and feeding system B. There are various methods of measuring a mixing degree of powdery materials, including Raman spectroscopy, infrared spectroscopy, X-ray diffraction, X-ray transmission measurement, and high performance liquid chromatography (HPLC). Any method achieving prompt measurement of a mixing degree is applicable to the exemplary invention. In an exemplary case where the near infrared reflectance (NIR, or a near infrared absorption spectrum method) is adopted, in order to evaluate an amount or a percentage (i.e., a ratio) of the principal agent in the mixed-powdery materials (i.e., uniformity of the mixed-powdery materials) (whether or not the mixed-powdery materials are segregated), the shifting mixed-powdery materials are irradiated with near infrared light to measure light absorption and scattering for qualitative and quantitative analyses of a concentration and the like of the principal agent based on a spectrum. These analyses are repeatedly conducted at predetermined cycles. A measured wavelength falls in a wavelength range including a unique absorption peak of the principal agent and no peak of the excipient or the lubricant. The near infrared reflectance also achieves measurement of particle diameters of the mixed-powdery materials. When the near infrared reflectance is adopted, the feeder A1 includes a near infrared sensor as a process analytical technology (PAT) sensor configured to measure a mixing degree or the like of powdery materials.

The product-unloading portion of the molding machine A further includes a molded product removal mechanism W (e.g., see FIG. 2) configured to select a specific molded product such as a defective product or a sampled product from among molded products collected at the molded product collecting position 18. Specifically, the guide member 17 is provided therein with an air passage 16 for a pressurized air flow, and the air passage 16 has a distal end functioning as an air spray nozzle 16a opened laterally outward in the radial direction of the turret 3. A flow passage 20 connects an air feed source (not shown) such as a pump configured to feed pressurized air and the air passage 16, and a control valve 22 is disposed on the flow passage 20 to open and close the flow passage 20. Examples of the control valve 22 include an electromagnetic solenoid configured to open in accordance with a control signal transmitted from a control device or the like.

If the control valve 22 is opened while a specific molded product pushed out of the die bore 4 is passing by the air spray nozzle 16a before contacting the guide member 17, then the air spray nozzle 16a discharges pressurized air fed from the air feed source through the flow passage 20 and the air passage 16 in the guide member 17. The discharged air blows the specific molded product outward from the table 31. The blown molded product will not reach the molded product collecting position 18 ahead of the guide member 17. As described above, the molded product removal mechanism W in the molding machine A according to the exemplary embodiment includes the passages 16 and 20 for air fed from the air feed source, the air spray nozzle 16a, and the control valve 22.

If a composition, the mixing degree, or the like of the mixed-powdery materials measured by the near infrared sensor or the like included in the feeder A1 is inappropriate, then the mixed-powdery materials in the feeder A1 are once filled in the die bore 4 of the die table 31 in the compression-molding machine A and are compression molded by the upper and lower punches 5 and 6 into the shape of the molded product. The molded product is then removed by the molded-product removal mechanism W before reaching the molded-product collecting position 18. Specifically, the control valve 22 in the molding machine A is opened when the die bore 4 filled with defective mixed-powdery materials tableted into a molded product passes by the air spray nozzle 16a, and the air spray nozzle 16a sprays air to blow the molded product out of the die table 31. In addition, an alarm sound can be issued, the device can be stopped, or the like.

When the powdery-material mixing and feeding system B is connected to the molding machine A, an inner end and the discharge port B512 of the case B51 of the horizontal mixer B5 are inserted into the frame 1 of the molding machine A. Meanwhile, the remaining elements of the powdery-material mixing and feeding system B, specifically, the portion other than the inner end of the case B51 of the horizontal mixer B5, the vertical mixer B4, and the volumetric feeders B1, B2 and B3 are kept outside the frame 2 of the molding machine A. The powdery-material mixing and feeding system B includes a support body (a frame or a housing) B6 that supports the volumetric feeders B1, B2 and B3, the vertical mixer B4, and the horizontal mixer B5 and has a bottom including casters B7 configured to easily shift the powdery-material mixing and feeding system B.

Figure 5:
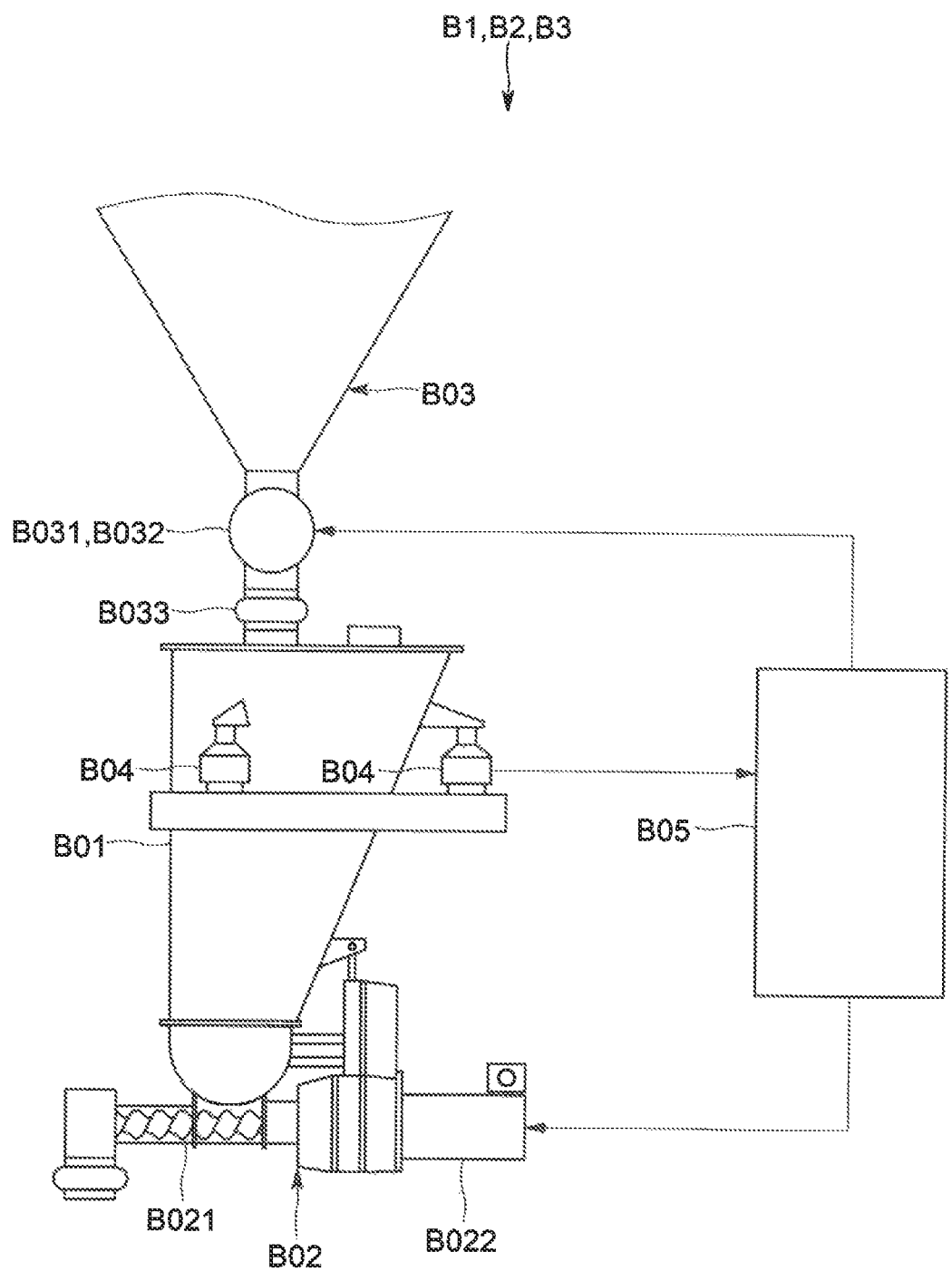
FIG. 5 is a side view of a powdery-material feeding device included in the powdery-material mixing and feeding system according to the exemplary embodiment.

Hereinafter, the volumetric feeders B2, B2 and B3 will be additionally described in terms of their structures. As shown exemplarily in FIG. 5, the feeders B1, B2 and B3 each include a hopper B01 configured to reserve a powdery material, a transfer mechanism B02 configured to deliver and to discharge the powdery material fed from the hopper B01, a supply mechanism B03 configured to timely supply the hopper B01 with a powdery material, a measuring instrument B04 configured to measure a discharge flow rate per unit time of the powdery material delivered to be discharged by the transfer mechanism B02, and a controller B05 configured to control the transfer mechanism B02 to cause the discharge flow rate of the powdery material to have a required target value.

The transfer mechanism B02 includes a transfer member B021 configured to be in contact with the powdery material dropped from the hopper B01 and deliver the powdery material, and a motor B022 configured to drive to rotate the transfer member 13021. Examples of the transfer mechanism B02 include a screw feeder, a table feeder, a circle feeder (registered trademark), a disk feeder, and a rotary feeder. The transfer member B021 in the screw feeder B02 is embodied by a screw blade including a shaft configured to rotate about an axis and spiral blades attached to the shaft. The screw blade is configured to transfer a powdery material caught between the adjacent blades along the axis. The transfer member in the table feeder, the circle feeder (registered trademark), the disk feeder, or the rotary feeder is configured by a rotary table, a flat bar (e.g., a rotary blade), a disk, or a rotor (equipped in a rotary valve), respectively. The exemplary embodiment assumes that the transfer mechanism B02 is configured by a screw feeder. The motor B022 configured to drive the transfer member B021 has rotational speed influencing a flow rate per unit time of a powdery material delivered by the transfer mechanism B02. Increase in rotational speed of the motor B022 typically leads to increase in flow rate of a delivered powdery material per unit time.

Examples of the motor B022 (and a motor B032 of the supply mechanism B03 to be described later) include a direct current (DC) motor, particularly a brushless DC motor. The DC motor has basic properties expressed by $$V_M = I_a R_a + E_a$$

$$E_a = K_e N$$

$$T = K_t I_a = -(K_t K_e N)/R_a + (K_t V_M)/R_a$$

In these equations, $V_M$ indicates power supply voltage applied to a coil of the DC motor, $I_a$ indicates a current flowing through the coil of the DC motor, $R_a$ indicates armature resistance, $E_a$ indicates voltage of counter electromotive force. T indicates torque generated by the DC motor, $K_t$ indicates a torque constant, $K_e$ indicates a counter electromotive force constant, and N indicates rotational speed of the DC motor.

The supply mechanism B03 is embodied by a rotary feeder or the like, is disposed above the hopper B01, and reserves a large amount of a powdery material to be supplied to the hopper B01. The supply mechanism B03 facing the hopper B01 has a rotary valve B031 disposed below the supply mechanism B03. The supply mechanism B03 opens the rotary valve B031 to supply the hopper B01 with the reserved powdery material when the powdery material in the hopper B01 decreases to reach a predetermined lower limit amount. When the powdery material in the hopper 1301 increases to reach a predetermined upper limit amount, the supply mechanism B03 closes the rotary valve B031 to prevent the hopper B01 from being supplied with any more powdery material.

The measuring instrument B04 is configured to repetitively detect current weight of the hopper B01 and the powdery material reserved in the hopper B01. Decreased weight is equal to amounts of the powdery materials discharged from the volumetric feeders B1 to B3. Examples of the measuring instrument B04 include a load cell functioning as a strain gauge sensor, a tuning fork force sensor, and a force balance sensor. The supply mechanism B03 and the hopper B01 are connected to each other via a bellows joint B033 or the like, to prevent weight of the supply mechanism B03 itself and weight of the powdery material reserved in the supply mechanism B03 (and to be supplied to the hopper B01 later) from being applied to the hopper B01. The measuring instrument B04 does not detect the weight of the supply mechanism B03 and the powdery material reserved in the supply mechanism B03.

The controller B05 receives an output signal from the measuring instrument B04 to obtain a weight of the powdery material currently reserved in the hopper B01, and controls the motor B022 configured to drive the transfer member (i.e., the screw blade of the screw feeder) B021 in the transfer mechanism B02 and the motor B032 configured to drive the rotor of the rotary valve B031 in the supply mechanism B03.

The controller B05 includes, as elements, a motor driver configured to turn ON or OFF the motors B022 and B032 and control rotational speed or output torque of the motors B022 and B032, a microcomputer configured to command the motor driver to achieve target rotational speed or output torque of the motors B022 and B012, a programmable controller, a widely used personal computer or work station, and the like. The motor driver sequentially applies current to coils of respective phases included in the motors B022 and B032 to rotate the motors B022 and B032, and controls the rotational speed and the output torque of the motors B022 and B032. Increase in current and/or voltage applied to the coils in the motors B022 and B032 leads to an increase in output torque as well as an increase in rotational speed of the motors B022 and B032. Decrease in current and/or voltage applied to the coils in the motors B022 and B032 leads to a decrease in output torque as well as a decrease in rotational speed of the motors B022 and B032. Each of the motors B022 and B032 may be controlled such that the current flowing in the coil is increased or decreased by pulse width modulation (PWM) control.

The controller B05 in each of the volumetric feeders B1, B2 and B3 according to the exemplary embodiment basically feedback-controls (e.g., PID controls) the discharge flow rate per unit time of the powdery material discharged from a corresponding one of the volumetric feeders B1, B2 and B3 by the loss-in-weight system (i.e., loss integrated value system). Specifically, the measuring instrument B04 constantly measures a weight of a powdery material discharged from the hopper B01 to be delivered by the transfer mechanism B02, compares the decreased weight with the preset target value of the discharge flow rate to find whether or not the decreased weight transitions to match the target value of the discharge flow rate, increases or decreases the rotational speed and/or the output torque of the motor B022 as a manipulated variable in order to reduce a difference therebetween, and increases or decreases the discharge flow rates of the powdery materials discharged from the volumetric feeders B1, B2 and B3.

The controller 1105 further actuates the motor B032 configured to drive the rotor of the rotary valve B031 in the supply mechanism B03 to supply the hopper B01 with the powdery material reserved in the supply mechanism B03 when the powdery material in the hopper B01 decreases to reach the predetermined lower limit amount, as described earlier. If the powdery material in the hopper B01 increases to reach the predetermined upper limit amount, then the controller B05 stops the motor B032 to prevent the hopper B01 from being supplied with any more powdery material.

The controller B05 according to the exemplary embodiment is configured to selectively conduct constantly keeping-control of constantly keeping, without changing, the current applied to the motor B022 as the manipulated variable for the predetermined period even upon an increase or a decrease in discharge flow rate of the powdery material, or feedback-control of repetitively obtaining the difference between the discharge flow rate of the powdery material and the target value thereof at the predetermined cycles and adjusting by increasing or decreasing the current applied to the motor B022 at each of the predetermined cycles in order to reduce the difference. The controller B05 conducts the following control for a time period immediately after a start and a time period immediately after the hopper B01 is supplied with the powdery material reserved in the supply mechanism B03. Specifically, the controller B05 conducts the constantly keeping-control immediately after the motor B022 starts and immediately after the hopper B01 is supplied with the powdery material, and shifts to the feedback-control if an absolute value of the difference between the discharge flow rate of the powdery material and the target value is small enough to be equal to or less than a threshold after elapse of the period for the constantly keeping-control, or conducts constantly keeping-control again, instead of shifting to the feedback-control, if the absolute value of the difference between the discharge flow rate of the powdery material and the target value thereof is large enough to be more than the threshold after elapse of the period for the constantly keeping-control. The controller B05 conducts control of changing the current applied to the motor B022 during the repeated constantly keeping-control in accordance with the difference between the discharge flow rate of the powdery material and the target value thereof after elapse of the period for latest constantly keeping-control. During the above control, a magnitude of the current flowing through the coil is adjusted by pulse width modulation (PWM) control. The tuning is conducted prior to a start for determination of a duty ratio corresponding to the target value of the discharge flow rate of the powdery material. During first constantly keeping-control, the current is applied to the coil of the motor B022 at the duty ratio determined during the tuning.

Figure 6:
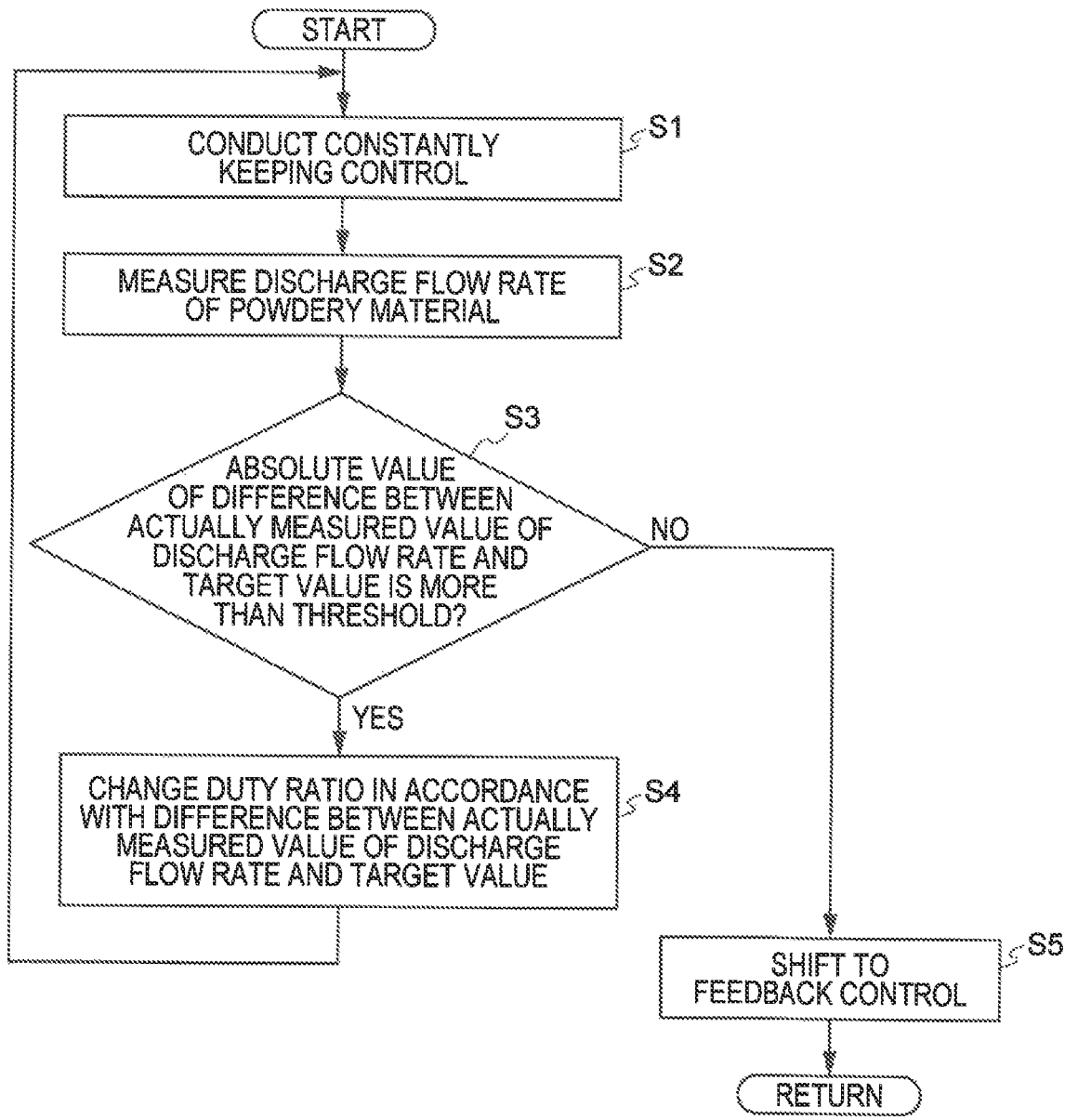
FIG. 6 is a flowchart showing a control flow conducted by a controller included in the powdery-material feeding device according to the exemplary embodiment.

More specifically, the controller B05 conducts constantly keeping-control (step S1) and measures the discharge flow rate of the powdery material (step S2), as exemplarily shown in a flowchart of FIG. 6. More specifically, the controller B05 receives, from the measuring instrument B04, a signal indicating mass of the powdery material discharged from the hopper B01, and assumes speed of decrease in mass as the discharge flow rate of the powdery material.

Subsequently, in a case where an absolute value $|\Delta F_1|$ of a difference between an actually measured value $F_1$ of the discharge flow rate and a target value $F_0$ is more than a threshold $F_s$ (step S3), the controller B05 determines new current $I_2$ applied to the motor B022 by multiplying a reciprocal $F_0/F_1$ of a percentage of the actually measured value $F_1$ of the discharge flow rate to the target value $F_0$, by current $I_1$ applied to the motor B022 during the latest constantly keeping-control (step S4), and conducts constantly keeping-control again (step S1).

In another case where the absolute value $|\Delta F_1|$ of the difference between the actually measured value $F_1$ of the discharge flow rate and the target value $F_0$ is less than the threshold $F_s$, the controller B05 shifts to feedback-control (step S5).

Figure 7:
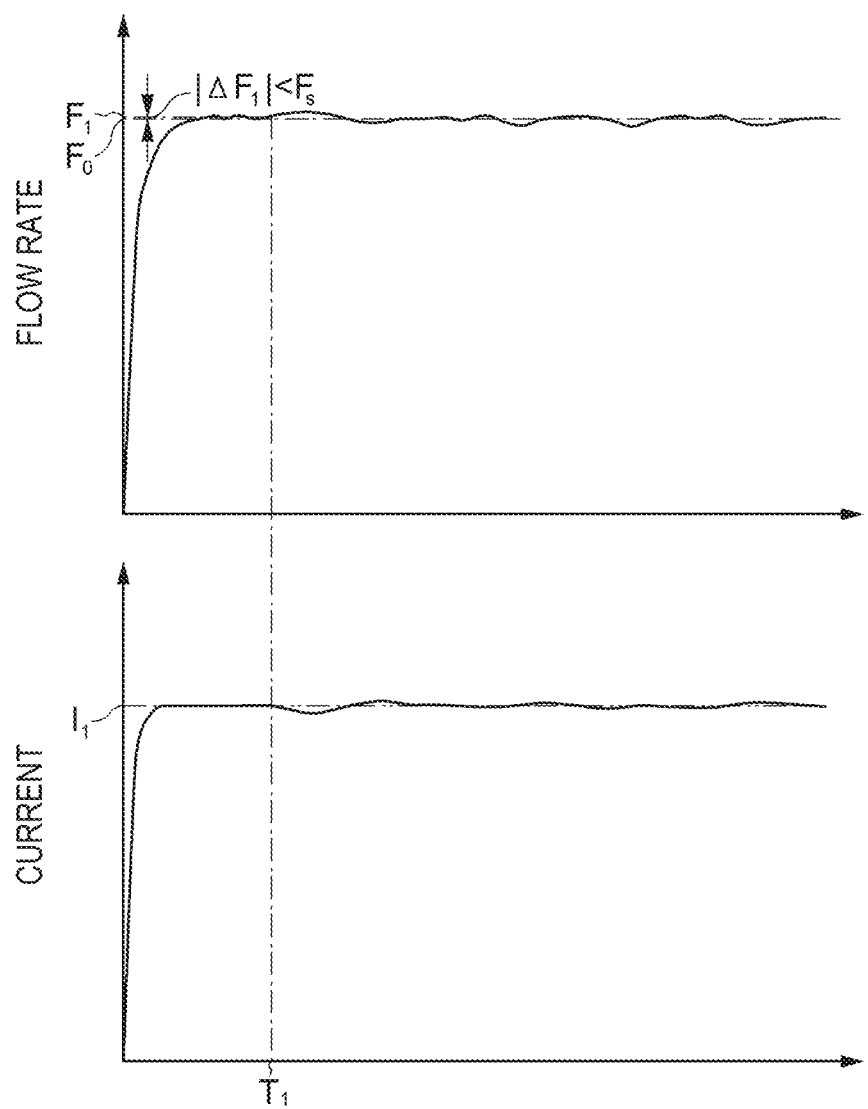
FIG. 7 is an explanatory time chart on contents of the control conducted by the controller included in the powdery-material feeding device according to the exemplary embodiment.
Figure 8:
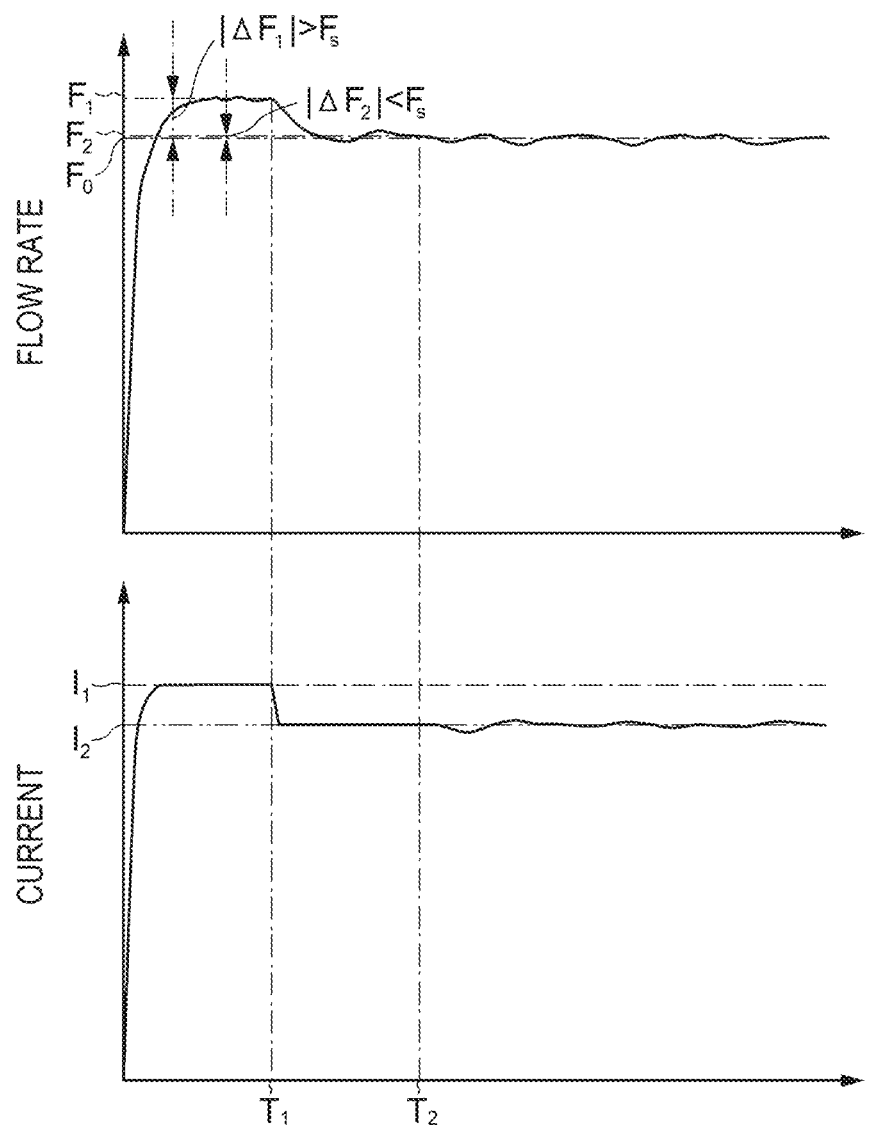
FIG. 8 is another explanatory time chart on the contents of the control conducted by the controller included in the powdery-material feeding device according to the exemplary embodiment.

FIGS. 7 and 8 each indicate a transition in discharge flow rate of the powdery material and in rotational speed of the motor immediately after a start.

FIG. 7 relates to a case where the actually measured value $F_1$ of the discharge flow rate of the powdery material corresponding to the current applied to the motor B022 during the first constantly keeping-control is not largely different from the target value $F_0$. In other words, FIG. 7 shows a case where the absolute value $|\Delta F_1|$ of the difference between the actually measured value $F_1$ of the discharge flow rate immediately after the first constantly keeping-control and the target value $F_0$ is less than the threshold $F_s$.

As described above, immediately after the motor B022 starts, the controller B05 conducts constantly keeping-control of constantly keeping, without changing, the current applied to the motor B022 as the manipulated variable for the predetermined period even upon an increase or a decrease in discharge flow rate of the powdery material. The controller B05 then readily shifts to feedback-control because the absolute value $|\Delta F_1|$ of the difference between the actually measured value $F_1$ of the discharge flow rate at time $T_1$ immediately after constantly keeping-control is conducted once and the target value $F_0$ is less than the threshold $F_s$.

FIG. B relates to another case where the actually measured value $F_1$ of the discharge flow rate of the powdery material corresponding to the current applied to the motor B022 during the first constantly keeping-control is largely different from the target value $F_0$. In other words, FIG. B shows a case where the absolute value $|\Delta F_1|$ of the difference between the actually measured value $F_1$ of the discharge flow rate immediately after the first constantly keeping-control is conducted and the target value $F_0$ is more than the threshold $F_s$. Also in this case, immediately after the motor B022 starts, the controller B05 conducts constantly keeping-control of constantly keeping, without changing, the current $I_1$ applied to the motor B022 as the manipulated variable for the predetermined period even upon an increase or a decrease in discharge flow rate of the powdery material. Because the absolute value of the difference between the actually measured value $F_1$ of the discharge flow rate at the time $T_1$ immediately after constantly keeping-control is conducted once and the target value $F_0$ is more than the threshold $F_s$, the controller B05 determines the new current $I_2$ applied to the motor B022 by multiplying the reciprocal $F_0/F_1$ of the percentage of the actually measured value $F_1$ of the discharge flow rate to the target value $F_0$, by the current $I_1$ applied to the motor B022 during the latest constantly keeping-control, and conducts constantly keeping-control again. The controller B05 then shifts to feedback-control because an absolute value $|\Delta F_2|$ of a difference between an actually measured value $F_2$ of the discharge flow rate at time $T_2$ immediately after second constantly keeping-control is conducted and the target value $F_0$ is less than the threshold $F_s$.

The controller B05 changes the duty ratio of the current applied to the motor B022 in accordance with the target value $F_0$ and the actually measured values $F_1$ and $F_2$ of the discharge flow rate, whereas FIGS. 7 and 8 indicate actually measured values of apparent current.

The predetermined period for constantly keeping-control is ten times or more the predetermined cycles for feedback-control, and is specifically set to several seconds or more, preferably ten seconds or more, and more preferably twenty seconds or more.

Figure 9:
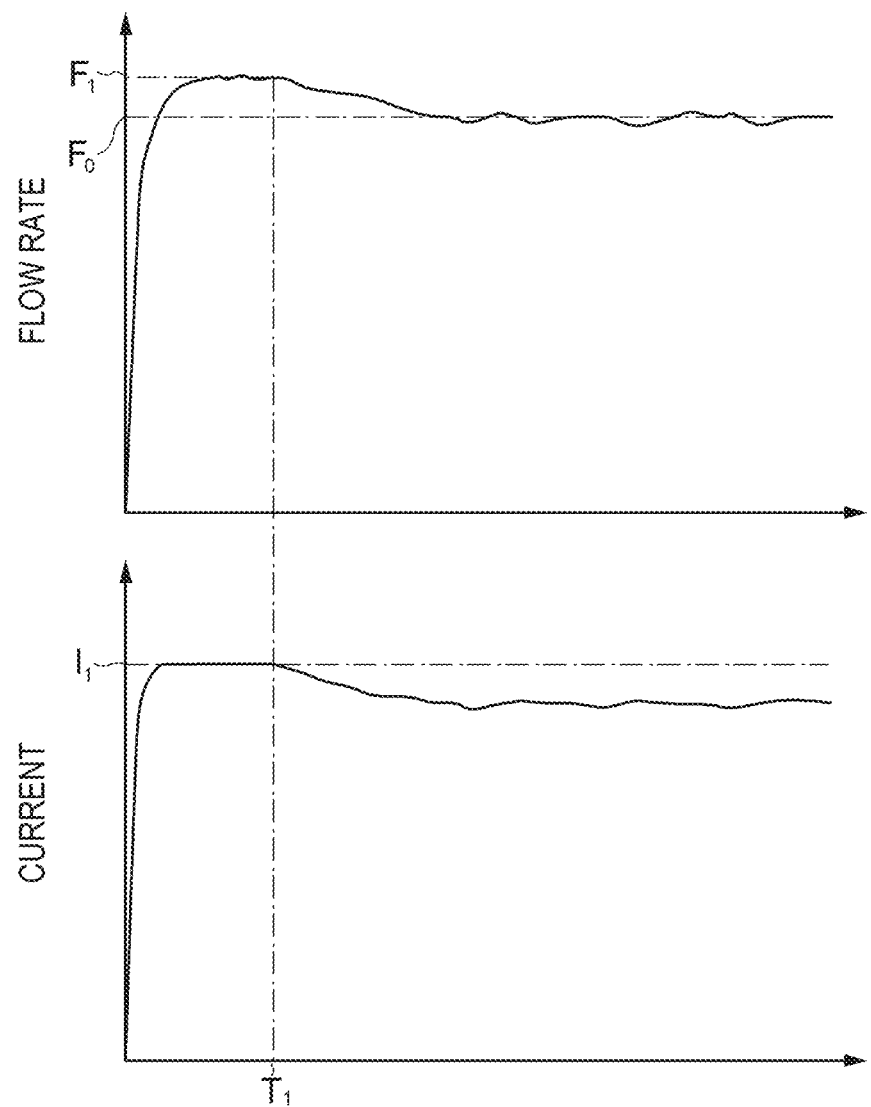
FIG. 9 is an explanatory time chart on contents of control conducted by a controller included in a conventional powdery-material feeding device.

In such a configuration, the discharge flow rate of the powdery material is measured immediately after a start and immediately after the hopper B01 is refilled with a powdery material, and constantly keeping-control is conducted again without shifting to feedback-control if the absolute value of the difference between the actually measured value $F_1$ of the discharge flow rate and the target value $F_0$ is more than the threshold. Furthermore, the current $I_1$ applied to the motor B022 during the repeated constantly keeping-control is changed in accordance with the difference between the actually measured value $F_1$ of the discharge flow rate of the powdery material after elapse of the period for the latest constantly keeping-control and the target value $F_0$ thereof. The current applied to the motor B022 can thus have a larger change range than a change range of the current applied to the motor B022 during feedback-control as indicated exemplarily in FIG. 9, so that the powdery material can be stabilized in terms of the supply amount more quickly.

Furthermore, the current $I_2$ applied to the motor B022 during the repeated constantly keeping-control is determined by multiplying the current $I_1$ applied to the motor B022 during the latest constantly keeping-control by the reciprocal $F_0/F_1$ of the ratio of the discharge flow rate $F_1$ of the powdery material after elapse of the period for the latest constantly keeping-control to the target value $F_0$ thereof, so that the discharge flow rate of the powdery material can approach to the target value more quickly.

Note that the exemplary invention is not limited to the exemplary embodiment described above.

The above exemplary embodiment adopts the current applied to the motor as the manipulated variable, and the current is changed by PWM control. The current may alternatively be changed by control in a different manner. Furthermore, the manipulated variable may alternatively be a voltage applied to the motor or a rotational speed of the motor.

The above exemplary embodiment includes conducting the control according to the exemplary invention immediately after the motor starts and immediately after the hopper is refilled with a powdery material. Even in a case where the control is conducted only immediately after the motor starts, the discharge flow rate of the powdery material can be stabilized more quickly at least immediately after the motor starts.

The flow rate is proportional to the motor rotational speed in the above exemplary embodiment, and the motor rotational speed is ordinarily proportional to the current applied to the motor. The duty ratio of the current as the manipulated variable during the repeated constantly keeping-control is accordingly determined by multiplying the duty ratio of the current during the latest constantly keeping-control by the reciprocal of the ratio of the flow rate of the powdery material at the time after elapse of the predetermined period from immediately after a start to the target value. In a case where the motor rotational speed is not necessarily proportional to the current applied to the motor, the manipulated variable during the repeated constantly keeping-control may be determined in a different manner. For example, there may be prepared a map indicating a relation between typical discharge flow rates and current corresponding thereto, and the current corresponding to a desired discharge flow rate may be determined through interpolation calculation.

The predetermined period for constantly keeping-control may be set appropriately.

Other than the above, the exemplary invention may be modified in various manners as long as not affecting the purpose of the exemplary invention.

The descriptions of the various exemplary embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A powdery-material feeding device, co p sing:
    a transfer member configured to deliver a powdery material to be discharged;
    a motor configured to drive the transfer member; and
    a controller configured to control the motor,
    wherein
    the controller selectively conducts
        constantly keeping-control of constantly keeping rotational speed of the motor, current or voltage applied to the motor without any change as a manipulated variable for a predetermined period even upon an increase or a decrease in discharge flow rate of the powdery material, or
        feedback-control of repetitively obtaining a difference between the discharge flow rate of the powdery material and a target value of the discharge flow rate of the powdery material at predetermined cycles and adjusting, by increasing or decreasing, the manipulated variable at each of the predetermined cycles in order to reduce the difference,
    the controller conducts the constantly keeping-control immediately after the motor starts,
    the controller shifts to the feedback-control when the difference between the discharge flow rate of the powdery material and the target value of the discharge flow rate of the powdery material has an absolute value less than a threshold after the period for the constantly keeping-control elapses, and
    the controller conducts constantly keeping-control again without shifting to the feedback-control when the absolute value of the difference between the discharge flow rate of the powdery material and the target value of the discharge flow rate of the powdery material is more than the threshold after the period for the constantly keeping-control elapses, and the manipulated variable during the repeated constantly keeping-control is changed in accordance with the difference between the discharge flow rate of the powdery material and the target value of the discharge flow rate of the powdery material after elapse of the period for latest constantly keeping-control.

2. The powdery-material feeding device according to claim 1, further comprising a hopper configured to reserve the powdery material,
    wherein the discharge flow rate of the powdery material is measured based on mass of the powdery material in the hopper.

3. The powdery-material feeding device according to claim 1, wherein the manipulated variable during the repeated constantly keeping-control is determined by multiplying the manipulated variable during the latest constantly keeping-control by a reciprocal of a ratio of the discharge flow rate of the powdery material after elapse of the period for the latest constantly keeping-control to the target value of the discharge flow rate of the powdery material.

4. The powdery-material feeding device according to claim 1, wherein the predetermined period for the constantly keeping-control is ten times or more the predetermined cycles for the feedback-control.

5. A powdery-material feeding device, comprising:
    a hopper configured to reserve a powdery material;
    a transfer member configured to deliver the powdery material to be discharged;

a motor configured to drive the transfer member; and
a controller configured to control the motor,
wherein
the controller selectively conducts
constantly keeping-control of constantly keeping rotational speed of the motor, current or voltage applied to the motor without any change as a manipulated variable for a predetermined period even upon an increase or a decrease in discharge flow rate of the powdery material, or
feedback-control of repetitively obtaining a difference between the discharge flow rate of the powdery material and a target value of the discharge flow rate of the powdery material at predetermined cycles and adjusting, by increasing or decreasing, the manipulated variable at each of the predetermined cycles in order to reduce the difference,
the controller conducts the constantly keeping-control immediately after the hopper is filled with the powdery material,
the controller shifts to the feedback-control when the difference between the discharge flow rate of the powdery material and the target value of the discharge flow rate of the powdery material has an absolute value less than a threshold after the period for the constantly keeping-control elapses, and
the controller conducts constantly keeping-control again without shifting to the feedback-control when the absolute value of the difference between the discharge flow rate of the powdery material and the target value of the discharge flow rate of the powdery material is more than the threshold after the period for the constantly keeping-control elapses, and the manipulated variable during the repeated constantly keeping-control is changed in accordance with the difference between the discharge flow rate of the powdery material and the target value of the discharge flow rate of the powdery material after elapse of the period for latest constantly keeping-control.

6. The powdery-material feeding device according to claim 5,
wherein the discharge flow rate of the powdery material is measured based on mass of the powdery material in the hopper.

7. The powdery-material feeding device according to claim 5, wherein the manipulated variable during the repeated constantly keeping-control is determined by multiplying the manipulated variable during the latest constantly keeping-control by a reciprocal of a ratio of the discharge flow rate of the powdery material after elapse of the period for the latest constantly keeping-control to the target value of the discharge flow rate of the powdery material.

8. The powdery-material feeding device according to claim 5, wherein the predetermined period for the constantly keeping-control is ten times or more the predetermined cycles for the feedback-control.

9. The powdery-material feeding device according to claim 2, wherein the manipulated variable during the repeated constantly keeping-control is determined by multiplying the manipulated variable during the latest constantly keeping-control by a reciprocal of a ratio of the discharge flow rate of the powdery material after elapse of the period for the latest constantly keeping-control to the target value of the discharge flow rate of the powdery material.

10. The powdery-material feeding device according to claim 2, wherein the predetermined period for the constantly keeping-control is ten times or more the predetermined cycles for the feedback-control.

11. The powdery-material feeding device according to claim 3, wherein the predetermined period for the constantly keeping-control is ten times or more the predetermined cycles for the feedback-control.

12. The powdery-material feeding device according to claim 6, wherein the manipulated variable during the repeated constantly keeping-control is determined by multiplying the manipulated variable during the latest constantly keeping-control by a reciprocal of a ratio of the discharge flow rate of the powdery material after elapse of the period for the latest constantly keeping-control to the target value of the discharge flow rate of the powdery material.

13. The powdery-material feeding device according to claim 6, wherein the predetermined period for the constantly keeping-control is ten times or more the predetermined cycles for the feedback-control.

14. The powdery-material feeding device according to claim 7, wherein the predetermined period for the constantly keeping-control is ten times or more the predetermined cycles for the feedback-control.

15. The powdery-material feeding device according to claim 9, wherein the predetermined period for the constantly keeping-control is ten times or more the predetermined cycles for the feedback-control.

16. The powdery-material feeding device according to claim 12, wherein the predetermined period for the constantly keeping-control is ten times or more the predetermined cycles for the feedback-control.

17. A powdery-material feeding device, comprising:
a transfer member configured to deliver a powdery material to be discharged;
a motor configured to drive the transfer member; and
a controller configured to control the motor,
wherein
the controller selectively conducts
constantly keeping-control of constantly keeping rotational speed of the motor, current or voltage applied to the motor without any change as a manipulated variable for a predetermined period even upon a modification in discharge flow rate of the powdery material, or
feedback-control of repetitively obtaining a difference between the discharge flow rate of the powdery material and a target value of the discharge flow rate of the powdery material at predetermined cycles and adjusting the manipulated variable at each of the predetermined cycles to reduce the difference,
the controller conducts the constantly keeping-control after the motor starts,
the controller shifts to the feedback-control when the difference between the discharge flow rate of the powdery material and the target value of the discharge flow rate of the powdery material has an absolute value less than a threshold after the period for the constantly keeping-control elapses.

18. The powdery-material feeding device according to claim 17, wherein
the controller conducts constantly keeping-control again without shifting to the feedback-control when the absolute value of the difference between the discharge flow rate of the powdery material and the target value of the discharge flow rate of the powdery material is more than the threshold after the period for the constantly keeping-control elapses, and the manipulated variable during the repeated constantly keeping-control is changed in accordance with the difference between the discharge flow rate of the powdery material and the target value of the discharge flow rate of the powdery material after elapse of the period for latest constantly keeping-control.

19. The powdery-material feeding device according to claim 17, further comprising a hopper configured to reserve the powdery material,
   wherein the discharge flow rate of the powdery material is measured based on mass of the powdery material in the hopper.

20. The powdery-material feeding device according to claim 18, wherein the manipulated variable during the repeated constantly keeping-control is determined by multiplying the manipulated variable during the latest constantly keeping-control by a reciprocal of a ratio of the discharge flow rate of the powdery material after elapse of the period for the latest constantly keeping-control to the target value of the discharge flow rate of the powdery material.

* * * * *